(12) United States Patent
White et al.

(10) Patent No.: US 8,210,550 B2
(45) Date of Patent: Jul. 3, 2012

(54) SUSPENSION SYSTEM FOR BABY STROLLER

(75) Inventors: Bryan T. White, Fremont, CA (US); Colter P. Leys, Menlo Park, CA (US); Albert H. Leung, Fremont, CA (US)

(73) Assignee: Orbit Baby, Inc., Newark, CA (US)

( * ) Notice: Subject to any disclaimer, the term of this patent is extended or adjusted under 35 U.S.C. 154(b) by 131 days.

(21) Appl. No.: 12/465,474

(22) Filed: May 13, 2009

(65) Prior Publication Data

US 2009/0302556 A1 Dec. 10, 2009

Related U.S. Application Data (60) Provisional application No. 61/060,060, filed on Jun. 9, 2008.

(51) Int. Cl.
*B60G 9/00* (2006.01)
(52) U.S. Cl. ....... 280/124.1; 16/18 R; 16/44; 280/47.38; 280/47.41; 280/124.167; 280/124.169; 280/647; 280/650
(58) Field of Classification Search ............... 280/124.1, 280/124.166, 124.167, 124.169, 124.177, 280/124.178, 47.38, 47.41, 47.4, 47.39, 647, 280/648, 649, 650; 16/18 R, 44, 35 R, 35 D
See application file for complete search history.

(56) References Cited

U.S. PATENT DOCUMENTS

| | | | | |
|---|---|---|---|---|
| 3,601,424 A | * | 8/1971 | Badland | 280/124.13 |
| 5,301,931 A | * | 4/1994 | Bigo | 267/5 |
| 5,448,796 A | * | 9/1995 | Larson | 16/44 |
| 6,149,169 A | * | 11/2000 | Chelgren | 280/86.1 |
| 6,203,054 B1 | | 3/2001 | Matsumoto | |
| 6,499,184 B2 | * | 12/2002 | Plate | 16/44 |
| 6,532,623 B1 | * | 3/2003 | Watanabe | 16/35 D |
| 7,093,319 B2 | * | 8/2006 | Lemeur et al. | 16/44 |
| 7,338,122 B2 | | 3/2008 | Hei et al. | |
| 2007/0257457 A1 | | 11/2007 | Dotsey et al. | |
| 2009/0033051 A1 | | 2/2009 | Ahnert | |
| 2009/0205164 A1 | * | 8/2009 | Larson | 16/44 |
| 2010/0259026 A1 | * | 10/2010 | Patmont et al. | 280/124.169 |

FOREIGN PATENT DOCUMENTS

JP 6-199101 * 7/1994 .................. 16/44

OTHER PUBLICATIONS

Anonymous. (Unknown). "ROSTA Technology: ROSTA Rubber Suspension System," located at <http://www.vipro.co.za/Downloads/rosta-technology_rosta_system.pdf>, last accessed on May 26, 2009, pp. 6-12.

* cited by examiner

*Primary Examiner* — Eric Culbreth
(74) *Attorney, Agent, or Firm* — Morrison & Foerster LLP (57) ABSTRACT

A suspension system for a stroller is described. The suspension system may include a rotating damper mechanism used between a stroller frame and a stroller wheel. In one example, apparatus for providing suspension/damping of a stroller includes a first member attached to a stroller frame, a second member disposed co-axially with the first member and operable to rotate relative to the first member, and at least one elastic member (e.g., urethane) positioned between the first and second members for damping motion (e.g., rotational or translational motion) therebetween. In one example, four elastic members are disposed between the first and second members.

24 Claims, 9 Drawing Sheets

FIG. 7B
square halves closed

FIG. 7D
square halves open

SUSPENSION SYSTEM FOR BABY STROLLER

CROSS-REFERENCE TO RELATED APPLICATION

This application claims priority from U.S. Provisional Application No. 61/060,060, filed on Jun. 9, 2008, and titled "Suspension System for Baby Stroller," which is incorporated herein by reference in its entirety for all purposes.

BACKGROUND

1. Field

The present invention relates generally to suspension mechanisms and systems for baby strollers, and in one particular example, to a suspension system including a rotating damper design.

2. Related Art

Strollers are known to employ various types of wheel suspension mechanisms, if employed at all. The most common suspension system utilizes a coil spring surrounding a telescoping tube arrangement. Such a telescoping tube arrangement is further typically coupled to a swing arm on a frame part or on a pivot or swivel joint. The suspension system imparts up and down pivotal movement of the swing arms or arms to which the wheel or wheels are attached. The wheel suspension is achieved by this motion being biased against the spring.

BRIEF SUMMARY

According to one example, a suspension system including a rotating damper mechanism is described. The suspension system may include a first member attached to a stroller frame, a second member disposed co-axially with the first member and operable to rotate relative to the first member, and at least one elastic member (e.g., urethane) positioned between the first and second members for damping motion (e.g., translation and/or rotational motion) therebetween. In one example, multiple elastic members are disposed in a radial pattern between the first and second members. The first and second members may be attached directly or indirectly to the stroller frame or wheel.

In one example, the suspension system is tunable and may be initially preloaded to set the spring action of the suspension system at a desired point on a spring rate curve associated with the system. In another example, the system may allow for a selectable spring rate, which may be achieved by having a two stage rotation of the design with two separate rotating elements. A first rotating element is operable to deform the elastic members to affect their starting condition and shape (and thus change the position on a spring rate curve). The first rotating element may be coupled to a knob or selection device operable by a user to adjust the suspension during use, e.g., over time or based on varying conditions. In one example, the suspension system may include a fixed pivot with a spring element. In another example, the suspension system may include a combination pivot and damper assembly.

In another example, a suspension sub-assembly is described. The suspension sub-assembly comprises at least a first member and an elastic member. The elastic member may be disposed co-axially within or outside of the first member. The first member may further be configured for attachment to a portion of a stroller frame, stroller frame pivot arm, or wheel assembly, and disposed coaxially with a second member, wherein the elastic member is positioned between the first and second members for damping motion (e.g., translation and/or rotational motion) therebetween. In one example, multiple elastic members are disposed in a radial pattern between the first and second members. The first and second members may be attached directly or indirectly to the stroller frame or wheel.

Various examples and aspects of the present invention are better understood upon consideration of the detailed description below in conjunction with the accompanying drawings and claims.

DETAILED DESCRIPTION

The following description sets forth numerous specific configurations, parameters, and the like. It should be recognized, however, that such description is not intended as a limitation on the scope of the present invention, but is instead provided as a description of exemplary embodiments. Various modifications to the examples described will be readily apparent to those of ordinary skill in the art, and the general principles defined may be applied to other examples and applications without departing from the spirit and scope of the invention. Thus, the present invention is not intended to be limited to the examples described herein and shown, but is to be accorded a scope consistent with the claims.

Broadly speaking, and in one example, apparatus for a stroller suspension system is described, the apparatus including a rotating damper mechanism. In one example the apparatus includes a first member positioned coaxially within a second member, where the first and second members are capable of rotation relative to each other, e.g., as part of a pivot joint. Further, the apparatus includes one or more elastic or damper members positioned between the first and second members for damping relative motion (e.g., rotational or translational motion) of the first and second members. In one example, the first member is a rotatable element disposed partially within the second member; however, in other examples the stationary member can be positioned partially within the rotating member. The stationary member is generally referred to as a portion of the baby stroller (or a member generally fixed with respect to the baby stroller frame) and the rotating member a portion of a wheel support (or a member generally fixed with respect to the wheel support); however, it will be recognized that during operation both members may move.

Various baby strollers may include a suspension system as described. An exemplary stroller is described and shown in U.S. Pat. No. 7,338,122, entitled "Modular Child Restraint System," which issued on Mar. 4, 2008, and is hereby incorporated by reference in its entirety. Of course, it will be recognized that the exemplary suspension system may be used with various other baby strollers, including, but not limited to basinet strollers, jogger strollers, and the like.

Figure 1:
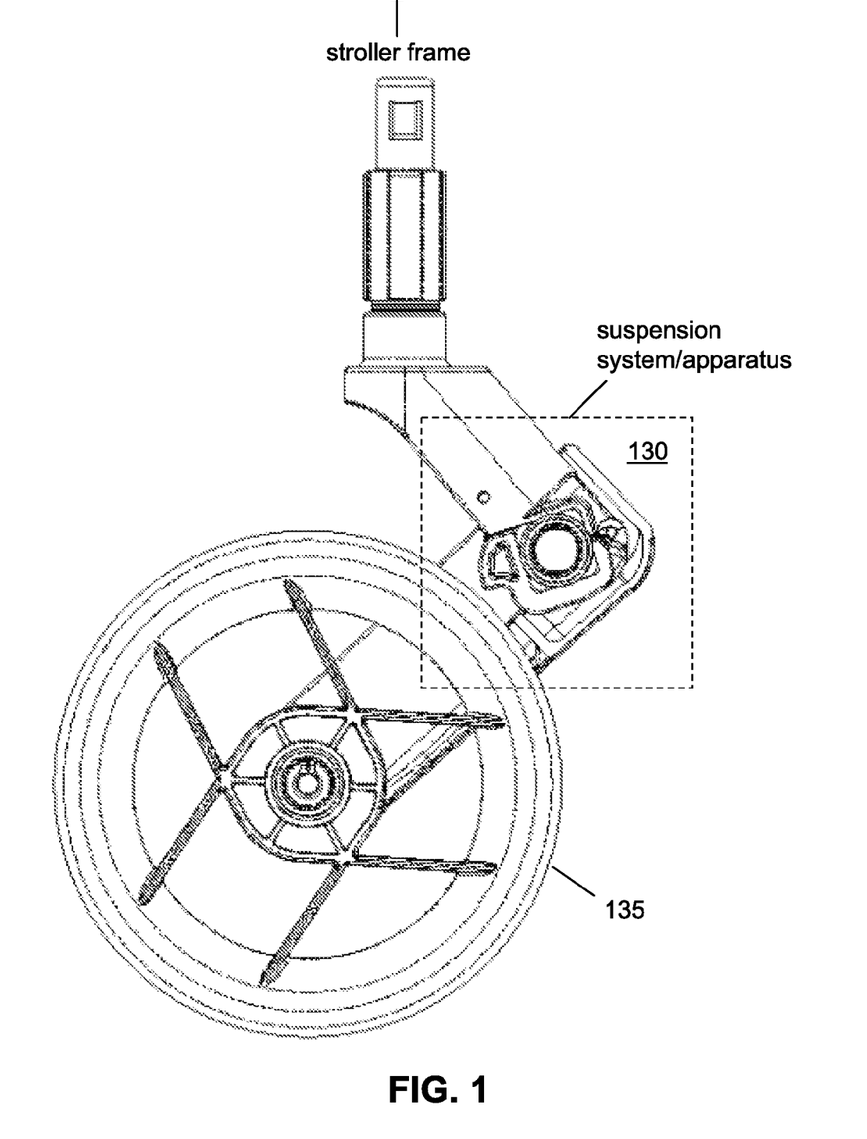
FIG. 1 illustrates a portion of a baby stroller including an exemplary suspension system according to one example.
Figure 2:
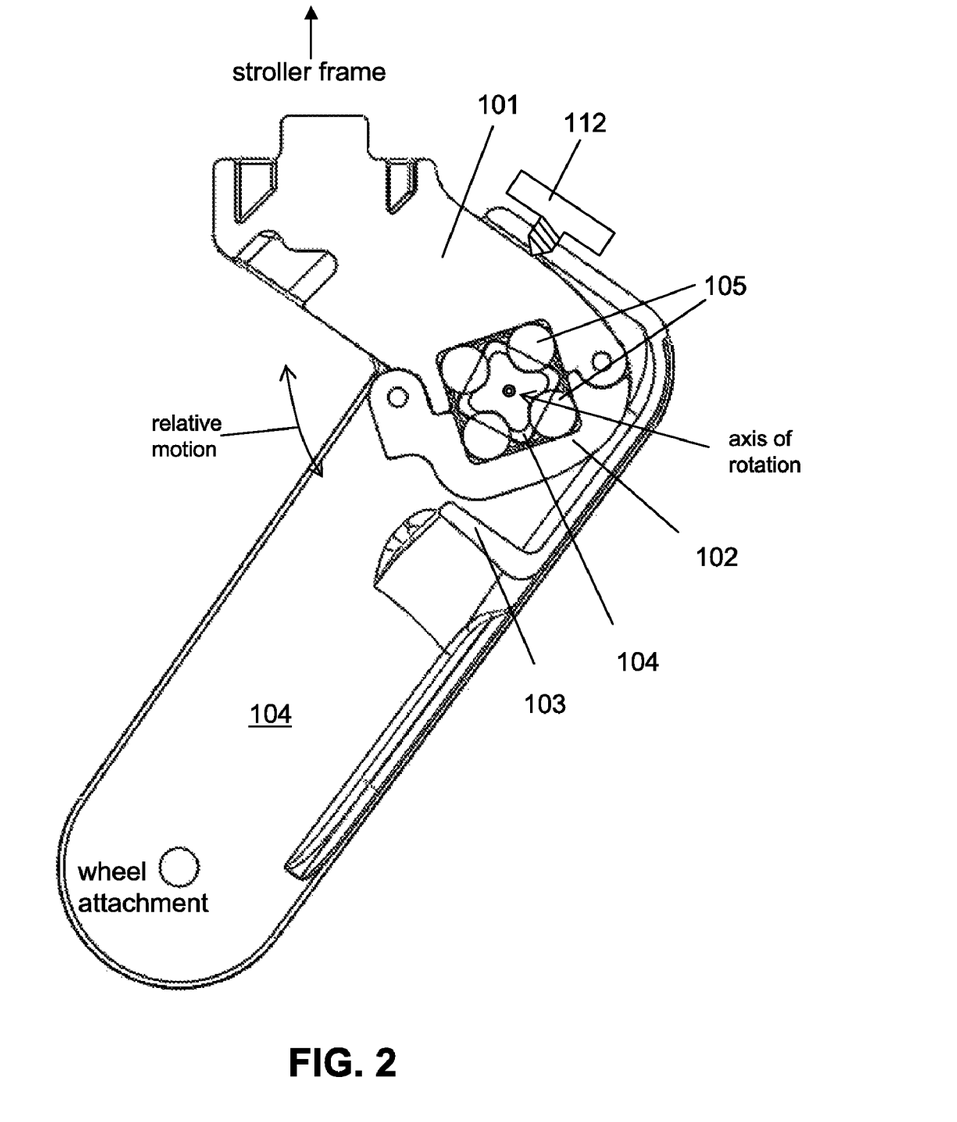
FIG. 2 illustrates a cross-sectional view of an exemplary suspension system.

FIG. 1 illustrates an exemplary suspension system 130 positioned with a stroller wheel 135 and a frame (not shown) of a baby stroller. FIG. 2 illustrates a cross-sectional view of the exemplary suspension system. In particular, a stationary member 101 is illustrated with a rotating member 104 disposed coaxially therein, rotating member 104 fixed with respect to structure supporting the stroller wheel as indicated. In this example, stationary member 101 and rotating member 104 are coupled in a pivot joint configuration.

Additionally, damper or elastic members 105 are disposed between stationary member 101 and rotating member 104 to dampen and/or resist movement of stationary member 101 relative to rotating member 104 about an axis of rotation thereof. In this example, four elastic members 105 are disposed in a radial pattern with respect to the axis of rotation. It should be recognized that stationary member 101 is not stationary in practice and that both stationary member 101 and rotating member 104 move and rotate relative to each other as illustrated. It is also noted that elastic members 105 may be compressed and triangular shaped as elastic members 505 seen in FIGS. 5G-5H, for example.

The exemplary suspension system may further include a moving suspension member 103, e.g., a spring, for biasing or resisting rotation of stationary member 101 relative to rotating portion 104. In other examples, however, the elastic members 105 may be used alone. Additionally, in some examples, a knob or selection device 112 may be operable by a user to adjust the suspension during use, e.g., over time or based on varying conditions, to deform the elastic members 105 and affect their starting condition and shape (and thus change the position on a spring rate curve). In other examples, selection device 112 may be included in other configurations, e.g., in-line with the axis of rotation of the joint.

With particular reference to FIG. 2, an exemplary operation is described. As described above, rotating member 104 is positioned within stationary member 101, where elastic members 105 are disposed between rotating member 104 and stationary member 101. The elastic members 105 may be initially compressed in an unloaded state, e.g., with out any torque or load forces from the stroller that may cause relative rotation of the stationary member 101 and rotating member 104. As the stroller is loaded, for example, stationary member 101 and rotating member 104 will be urged to rotate relative to each other. The relative movement between stationary 101 and rotating member 104 is damped or resisted by deformation or compression of elastic members 105. Elastic members 105 are generally deformed perpendicular to the rotation axis of the system. Further, moving suspension member 103 may provide further suspension or spring action for the supported stroller.

Figures 4A, 4B, 4C:
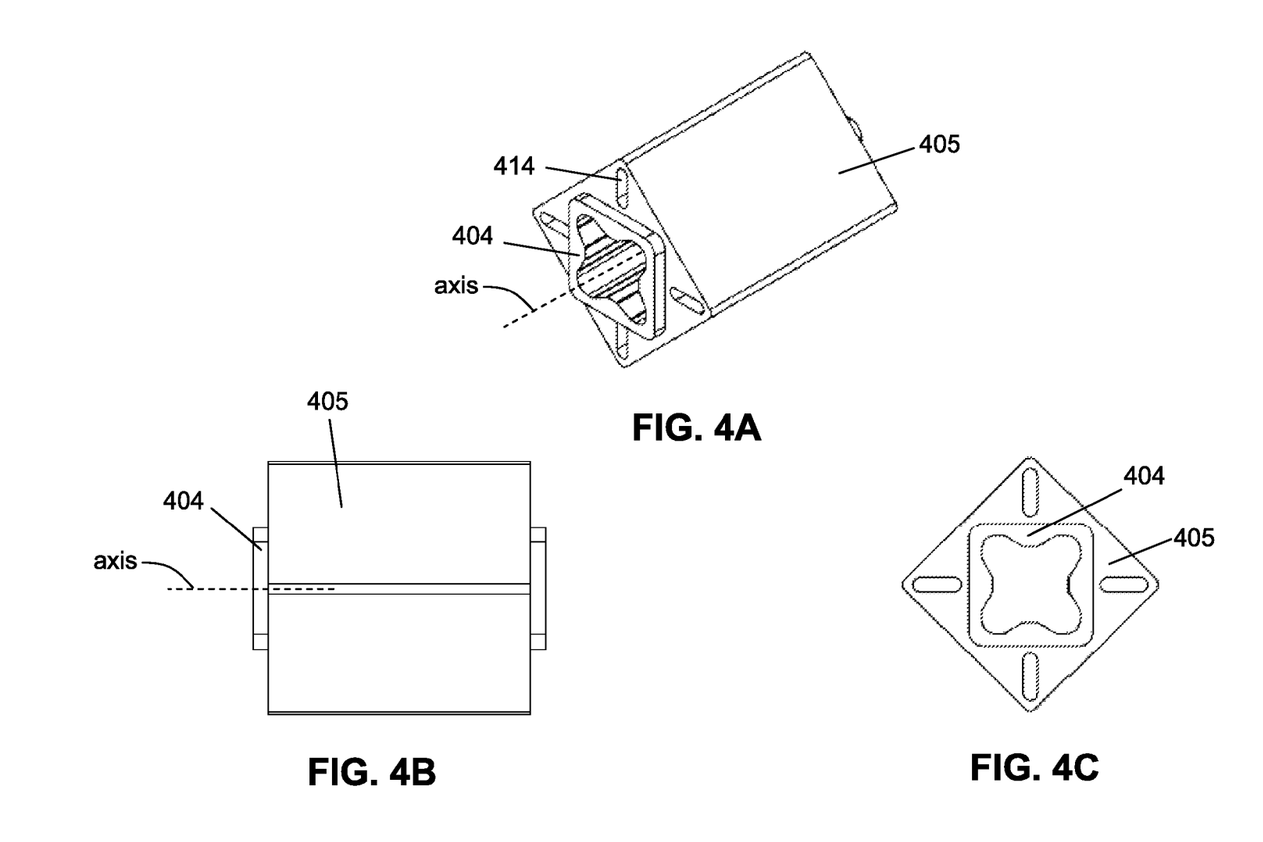
FIGS. 4A-4C illustrate perspective, cross-sectional, and side views of an exemplary suspension sub-system according to another example.

In one example, the suspension system includes multiple elastic members, e.g., four elastic members. In other examples, a single elastic member may be used (e.g., as seen in FIGS. 4A-4C), however, three or more elastic members positioned appropriately may provide for a self-centering feature of the rotating and stationary elements.

In one example, elastic elements 105 can serve as both a spring and a damper, deriving benefits of compactness and efficiency without having to have two separate elements. Further, in one example, elastic elements 105 may include urethane or another suitable damping material providing for good cold weather performance, rebound/compression/damping performance, chemical resistance, and the like.

The first and second members (e.g., stationary member 101 and rotating member 104) may include various materials such as injection molded plastic, aluminum, or the like. Further, the cross-sectional shape of the opposing surfaces of the first and second members are shown having a rectangular cross-sectional shape disposed initially offset by 45 degrees. In other examples, different opposing surface shapes may be used such as triangular, elliptical, circular, oval, polygonal, and the like. Further, the cross-sectional shapes do not need to be the same, e.g., the first member could be rectangular and the second member elliptical.

In one example, the first member (e.g., the stationary element 101) is split, e.g., comprising two or more portions that fit together around the second member (e.g., the rotating element 104 and the damping elements). For example, as seen in FIGS. 1 and 2, the stationary member 101 includes a clamping half 102 which, during assembly, is clamped around the second member 104 and elastic members 105. The design may provide for ease of manufacturing and cost savings over a non-split design, as well as ease of maintenance or replacement of the second member 104, elastic members 105, or the like. Other designs are possible and contemplated, e.g., a rotating damper assembly comprising unitary first and second members.

The exemplary suspension systems may also be tuned and/or adjusted. In one example, a user, whether manufacturer or end-user, may preload the system to achieve different spring constant rates of the system (e.g., to set the spring action at a different point on a spring rate curve associated with the system).

In another example, the system may include a selectable spring rate, which may be achieved by having a two stage rotation of the design with two separate rotating elements. A first rotating element is operable to deform the elastic members to affect their starting condition and shape (and thus change the position on a spring rate curve). The second rotating element is operable as described above. The first rotating element may be coupled to a knob or selection device (such as 112 illustrated in FIG. 2) operable by a user to adjust the suspension during use, e.g., over time or based on varying conditions.

Figures 3A, 3B, 3C:
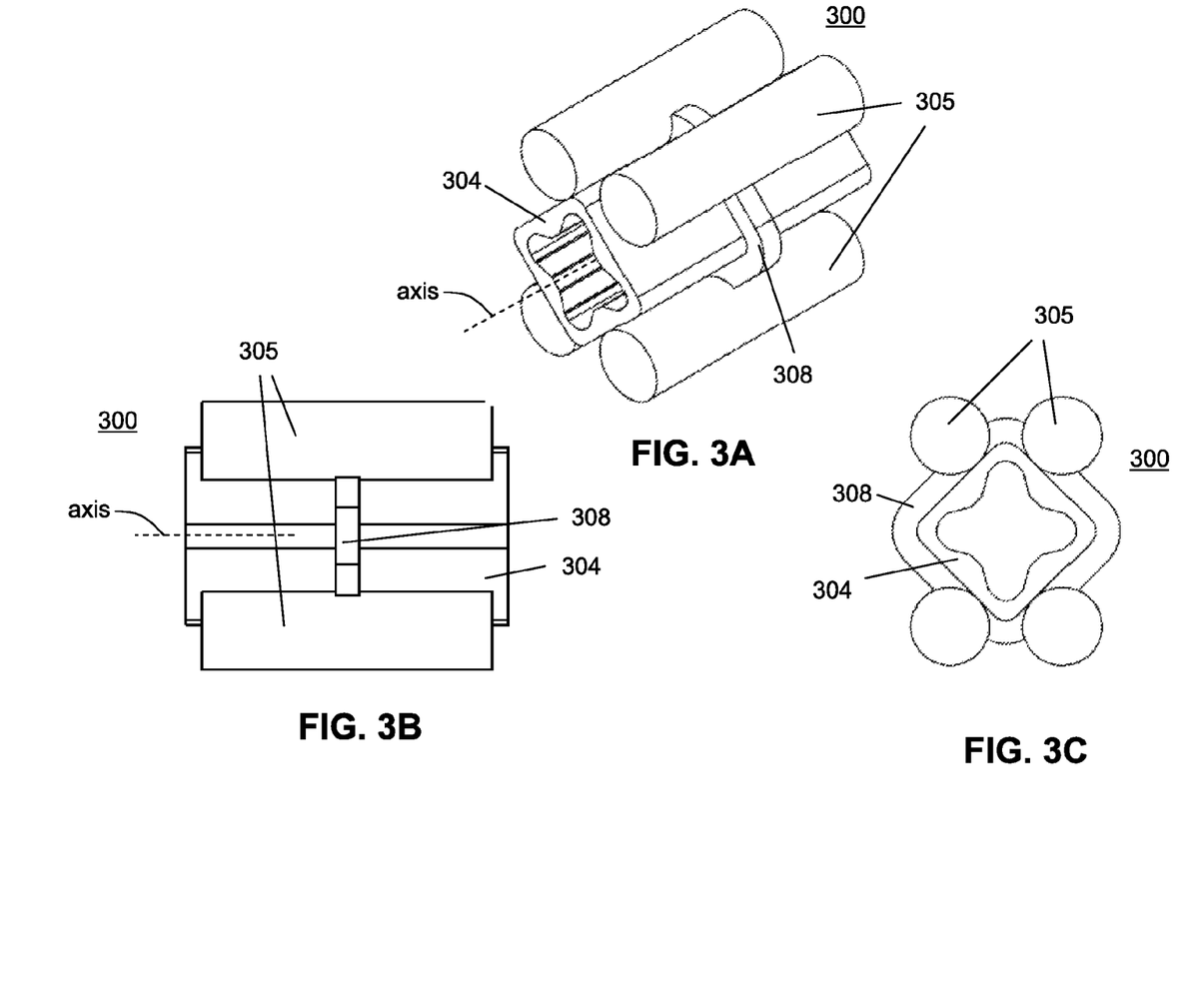
FIGS. 3A-3C illustrate perspective, cross-sectional, and side views of an exemplary suspension sub-system.

FIGS. 3A-3C illustrate perspective, cross-sectional, and side views of an exemplary suspension system sub-assembly 300, which includes structures similar to those shown in FIGS. 1 and 2. In particular, sub-assembly 300 includes elastic members 305 positioned circumferentially or radially around member 304, e.g., elastic members disposed in a radial pattern with respect to the axis of rotation of member 304. Member 304 may be attached to the stroller frame or wheel assembly, within and co-axially with another member similar to that shown in FIG. 2. For example, one or both ends may be affixed or fastened to a frame or wheel assembly as described previously.

In this example, sub-assembly 300 includes a support member 308 which is included to help secure the arrangement and orientation of elastic members 305. For instance, support member 308 may secure the position of the elastic members in a generally radial pattern around member 304, and in this example, offset from a center of the sides of member 304 as seen in FIG. 3C. Support member 308 may include the same or different material as elastic member 305 and may be formed integrally therewith. Further, support member 308 may include the same or different material as support member 304 and be formed integral therewith.

Additionally, suspension system sub-assemblies may include various configurations and effective spring constants for use with a stroller. Accordingly, a manufacture or user may select different sub-assemblies for use in a common pivot joint depending on various factors such as the type of stroller, intended use, rear wheel versus front wheel, and so on. Additionally, sub-assemblies may be replaced, for example, due to changes in use, weight of a child/seat, or if the spring constant changes over time due to use, exposure to weather (e.g., heat, cold, moisture, etc.), and so on.

FIGS. 4A-4C illustrate perspective, cross-sectional, and side views of an exemplary suspension sub-system for a baby stroller. This example is similar to FIGS. 1 and 2, however, only a single elastic member 405 is disposed coaxially and circumferentially around member 404, e.g., in a radial or circular pattern with respect to the axis of rotation of member 404. Elastic member 405 is for positioning between member 404 and a second member (as shown with respect to FIG. 2). In this example, a single elastic member 405 is disposed to extend circumferentially around member 404 (and in alternate examples, extend circumferentially within a member). In other examples, elastic member 405 could be replaced by multiple members extending circumferentially around rotating member 404. Further, elastic member 405 may include voids 414, which may be arranged and positioned to create particular spring constant characteristics of elastic member 405, reduce the weight of the elastic member 405, and so on.

FIGS. 5A-5H illustrate an exemplary suspension tuning or adjustment system for use with various suspension system examples described herein. In particular, FIGS. 5A-5D illustrate an example where inner member 504 (which will be disposed coaxially with or near the axis of rotation) may be expanded radially, thereby changing the amount of preload on the elastic members 505 shown in FIGS. 5G and 5H. In particular, expanding inner member 504 radially causes compression of elastic members 505, thereby preloading the system.

Figures 5A, 5B, 5C, 5D:
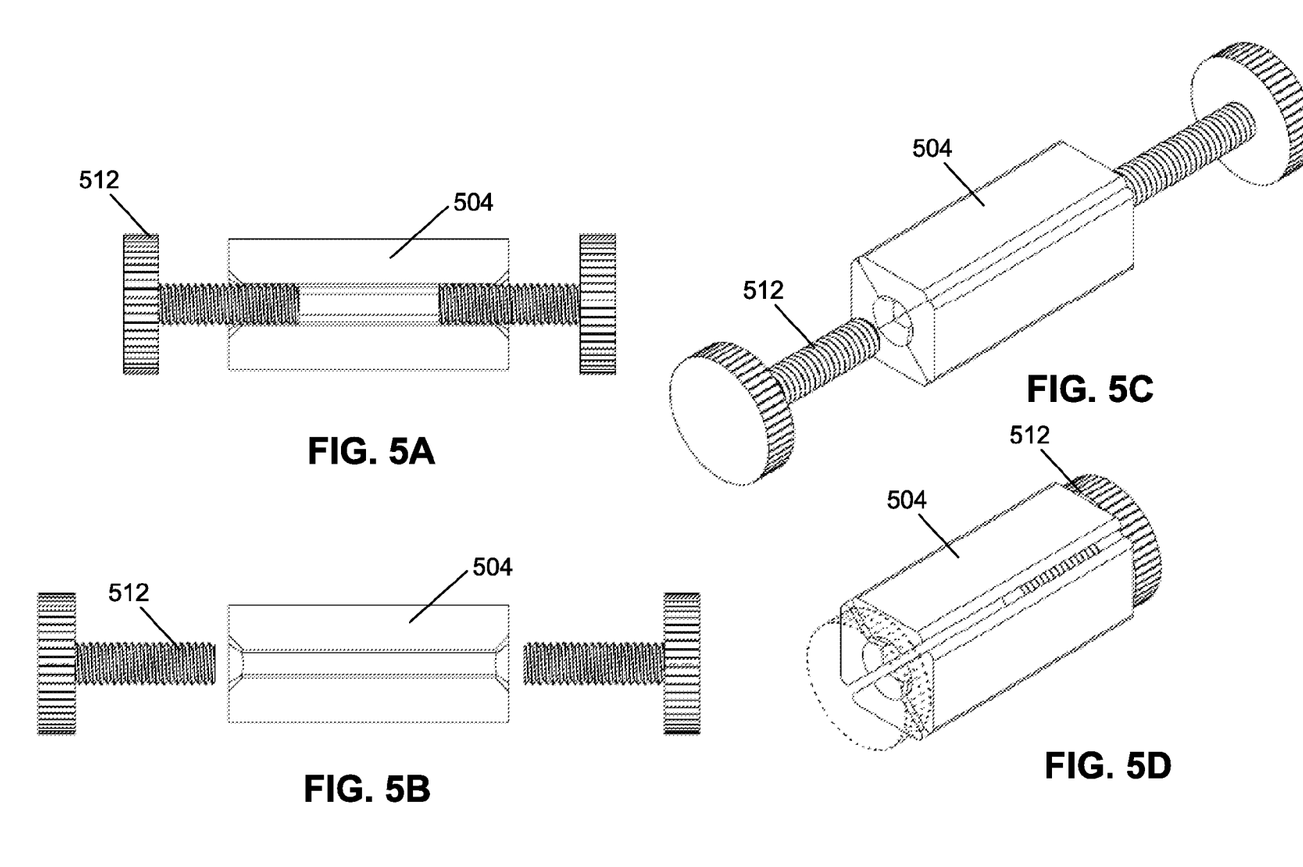
FIGS. 5A-5H illustrate an exemplary suspension adjustment system for use with exemplary suspension systems.
Figure 5E:
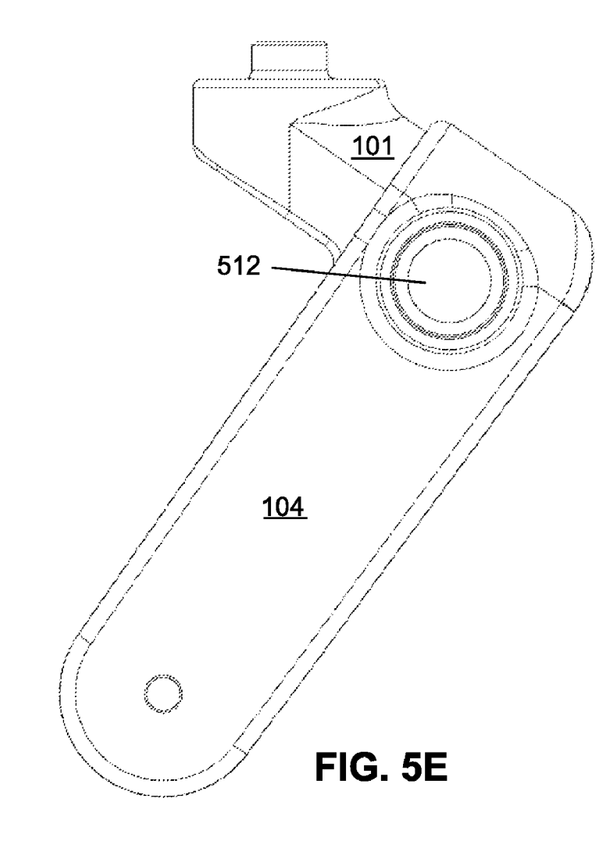
Figure 5F:
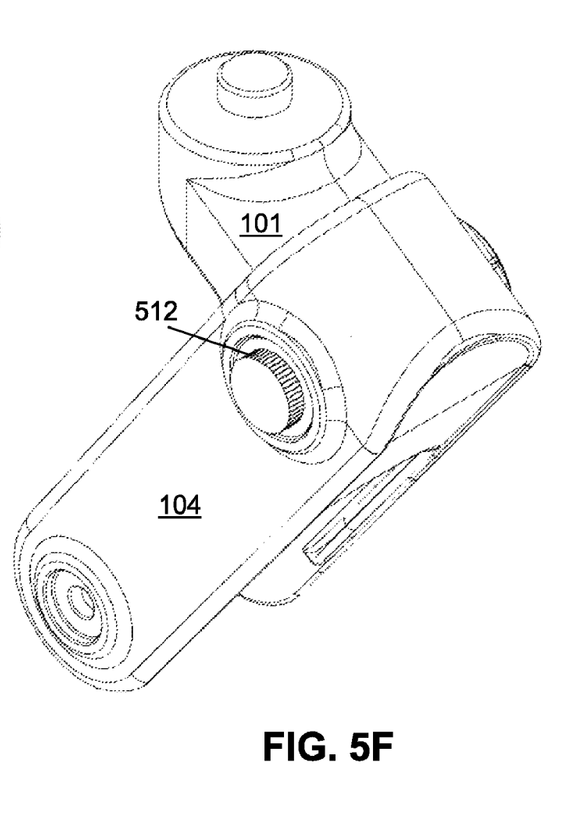
Figure 5G:
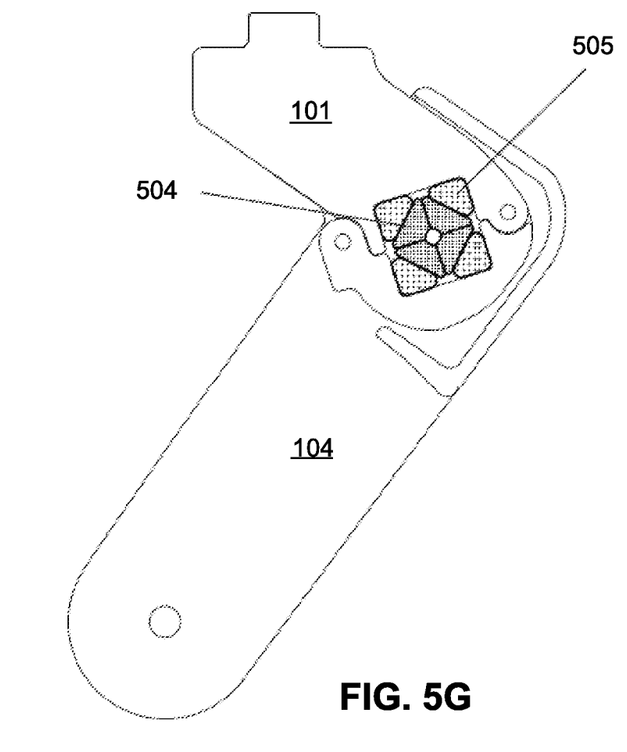
Figure 5H:
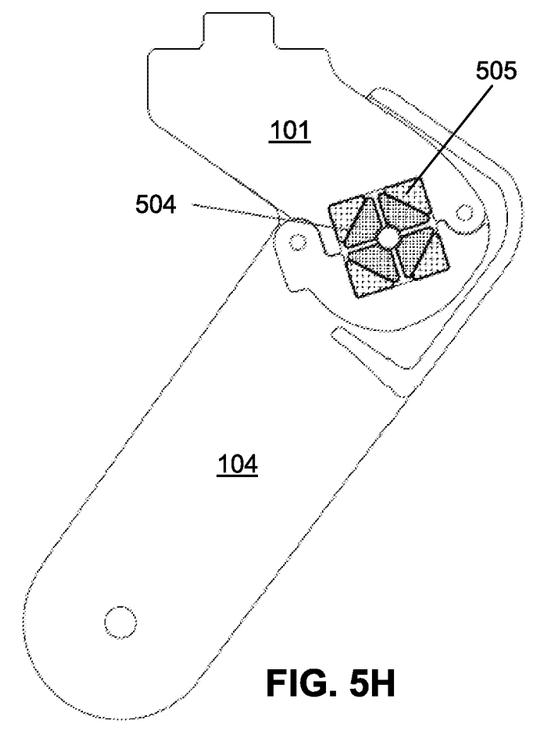

Inner member 504 may include a single member or four separate elements that can be driven apart by rotation of screw 512. FIGS. 5E-5F illustrate side views of screw 512 in relation to stationary member 101 and rotating member 104. FIGS. 5G-5H illustrate cross-sectional side views of inner member 504 and elastic members 505 in relation to stationary member 101 and rotating member 104. As shown in FIGS. 5A-5D, a user may adjust one or both of the screws 512 to expand or compress inner member 504, thereby changing the characteristics of the suspension system.

Figure 6A:
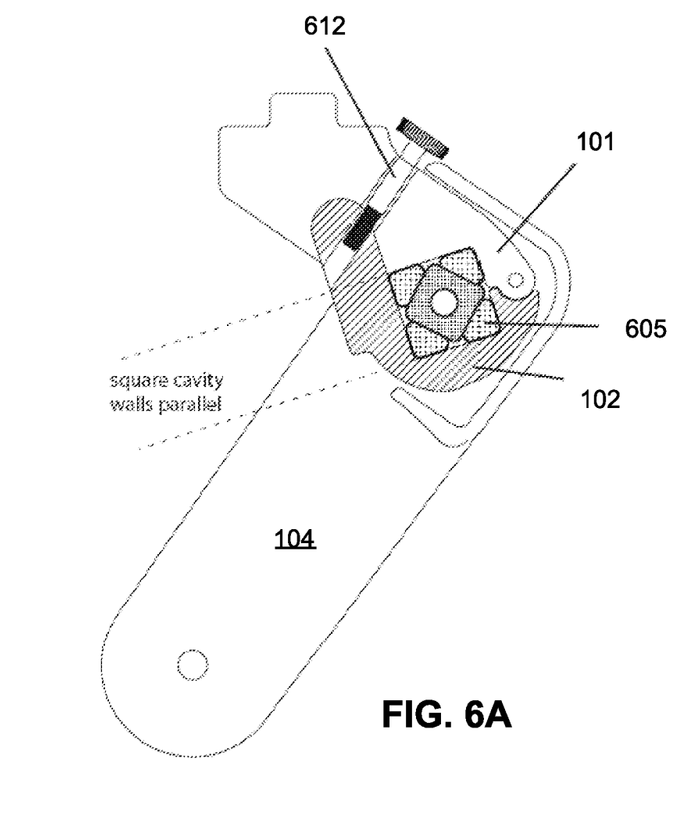
FIGS. 6A-6B illustrate an exemplary suspension adjustment system for use with exemplary suspension systems.
Figure 6B:
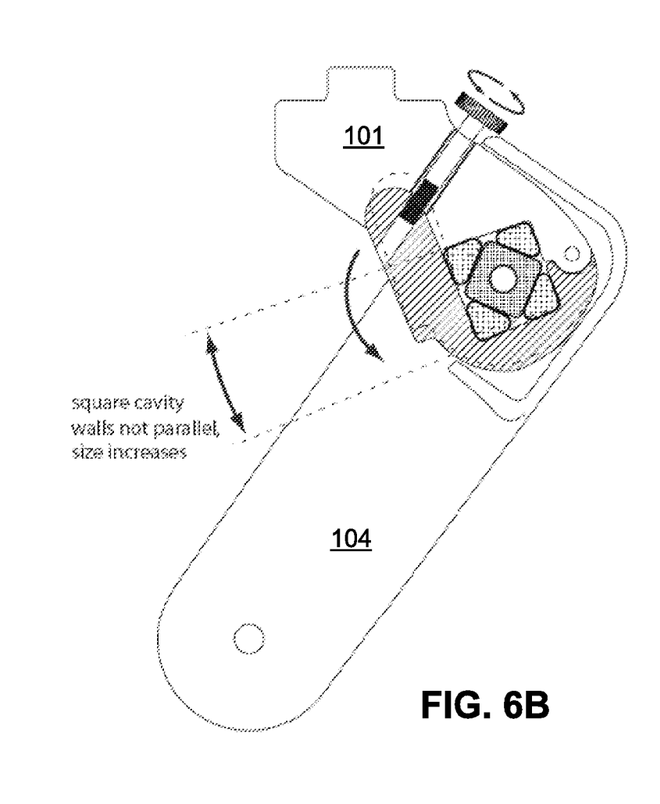
Figure 7A:
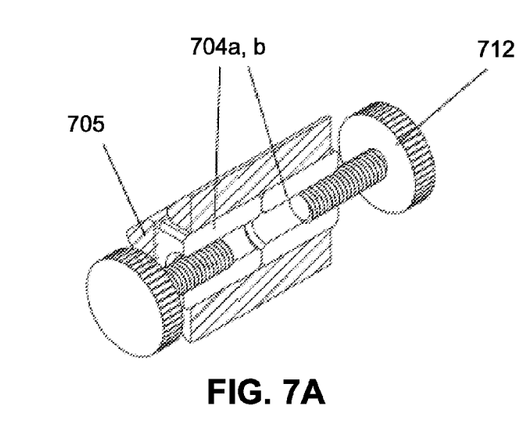
FIGS. 7A-7D illustrate an exemplary suspension adjustment system for use with exemplary suspension systems.
Figure 7B:
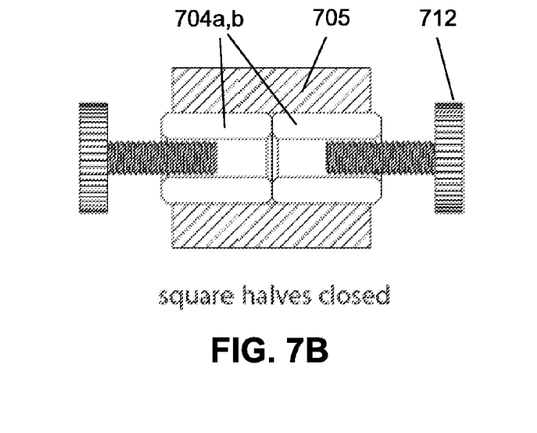
Figure 7C:
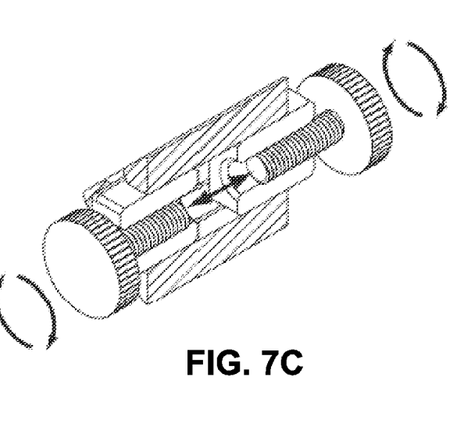
Figure 7D:
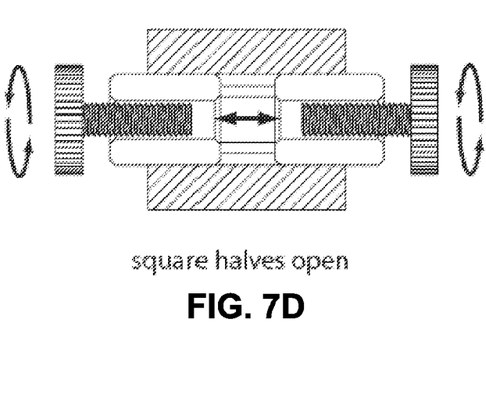

FIGS. 6A-6B illustrate another exemplary suspension tuning or adjustment system for use with various suspension system examples described herein. In this example, a screw 612 is included to adjust the angle of the square cavity-forming members, stationary member 101 and clamping member 102, which provides additional compression of the elastic members 605. In particular, screw 612 engages with a member connected to one of the suspension cavity members 102 and/or 104 and is operable to change the angle between the two cavity members 102 and 101. The change in angle changes the amount of preload on the suspension elements 605 as illustrated in the figures.

FIGS. 7A-7D illustrate another exemplary suspension tuning or adjustment system for use with various suspension system examples described herein. In this example, the inner square member is made of two separate halves 704a and 704b, separated along the longitudinal direction. One or more screws 712 can be arranged to move the two halves 704a and 704b apart from each other along the longitudinal direction to decrease the amount of surface area contacting the elastic members 705, thus changing the stiffness of the suspension system.

The foregoing descriptions of specific embodiments have been presented for purposes of illustration and description. They are not intended to be exhaustive, and it should be understood that many modifications and variations are possible in light of the above teaching. For example, various examples described herein may be used alone or in combination with other systems and methods, and may be modified for varying applications and design considerations. Accordingly, the present invention is defined by the appended claims and should not be limited by the description herein.

We claim:

1. A stroller, the stroller comprising:
 a suspension apparatus for providing suspension for the stroller, the apparatus comprising:
  a first member attached to a frame of the stroller;
  a second member coupled with the first member and operable to rotate relative to the first member;
  at least one elastic member positioned between the first and second members for damping motion therebetween, wherein the at least one elastic member is disposed around a common axis of rotation of the first and second members at the coupling of the first and second members; and
  a selector for altering the at least one elastic member to achieve a different spring rate for the at least one elastic member.

2. The stroller of claim 1, wherein the at least one elastic member comprises a single elastic member.

3. The stroller of claim 1, wherein the at least one elastic member comprises four elastic members disposed in a radial pattern between the first and second members.

4. The stroller of claim 1, wherein the at least one elastic member is disposed circumferentially around the common axis of rotation at the coupling of the first and second members, and the at least one elastic member is disposed between the first member and the second member at the coupling.

5. The stroller of claim 1, wherein the second member is composed of two portions fixed together around the first member and the at least one elastic member.

6. The stroller of claim 1, wherein the first and second members are disposed in a preloaded state.

7. The stroller of claim 1, wherein the selector is operable to at least partially rotate the first member relative to the second member to deform the at least one elastic member to achieve a different spring rate for the at least one elastic member.

8. The stroller of claim 1, wherein the first member and second member are coupled as a pivot joint.

9. The stroller of claim 1, wherein the selector is operable to at least partially move the at least one elastic member to change the amount of surface area contacting the first member, second member, or both, to achieve a different spring rate for the at least one elastic member.

10. A stroller, the stroller comprising:
 a suspension assembly system for the stroller, the system comprising:
  a first member;
  a second member coupled with the first member and operable to rotate relative to the first member;
  at least one elastic member positioned between the first and second members at the coupling of the first and second members around a common axis of rotation of the first and second members; and
  a selector for altering the at least one elastic member to achieve a different spring rate for the at least one elastic member.

11. The stroller of claim 10, wherein the at least one elastic member comprises a single elastic member.

12. The stroller of claim 10, wherein the at least one elastic member comprises four elastic members disposed in a radial pattern between the first and second members.

13. The stroller of claim 10, wherein the at least one elastic member comprises a plurality of elastic members disposed in a radial pattern between the first member and the second member.

14. The stroller of claim 10, wherein the selector is operable to at least partially rotate the first member relative to the second member to deform the at least one elastic member to achieve a different spring rate for the at least one elastic member.

15. The stroller of claim 10, wherein the selector is operable to at least partially move the at least one elastic member to change the amount of surface area contacting the first member, second member, or both, to achieve a different spring rate for the at least one elastic member.

16. A stroller, the stroller comprising:
a suspension assembly system for the stroller, the assembly comprising:
a first member, the first member having a junction with an axis of rotation at the junction;
at least one elastic member coupled with the first member, wherein the at least one elastic member is disposed in a radial pattern around the axis of rotation at the junction of the first member; and
a selector for altering the at least one elastic member to achieve a different spring rate for the at least one elastic member.

17. The stroller of claim 16, the assembly further comprising a second member for engaging the first member and the at least one elastic member at the junction.

18. The stroller of claim 16, the assembly further comprising a second member coupled with the first member at the junction and operable to rotate relative to the first member.

19. The stroller of claim 18, wherein the selector is operable to at least partially rotate the first member relative to the second member to deform the at least one elastic member to achieve a different spring rate for the at least one elastic member.

20. The stroller of claim 16, wherein the first member and the at least one elastic member are operable to be coupled with a second member that can rotate relative to the first member.

21. The stroller of claim 20, wherein the selector is operable to at least partially rotate the first member relative to the second member to deform the at least one elastic member to achieve a different spring rate for the at least one elastic member.

22. The stroller of claim 16, wherein the at least one elastic member comprises a single elastic member.

23. The stroller of claim 16, wherein the at least one elastic member comprises a plurality of elastic members disposed circumferentially around the axis of rotation at the junction of the first member.

24. The stroller of claim 16, wherein the selector is operable to at least partially move the at least one elastic member relative to the first member to change the amount of surface area contacting the first member to achieve a different spring rate for the at least one elastic member.

* * * * *